United States Patent
Nadig et al.

(10) Patent No.: US 11,017,283 B2
(45) Date of Patent: May 25, 2021

(54) ELECTRONIC TAG FOR A METAL COMPONENT OF A SYSTEM IN A HOUSING

(71) Applicant: GEMUE Gebr. Mueller Apparatebau GmbH & Co. Kommanditgesellschaft, Ingelfingen (DE)

(72) Inventors: Sebastian Nadig, Zweifelingen (DE); Juergen Wagner, Niedernhall (DE)

(73) Assignee: GEMUE Gebr. Mueller Apparatebau GmbH & Co. Kommanditgesellschaft, Ingelfingen (DE)

( * ) Notice: Subject to any disclaimer, the term of this patent is extended or adjusted under 35 U.S.C. 154(b) by 79 days.

(21) Appl. No.: 16/429,264

(22) Filed: Jun. 3, 2019

(65) Prior Publication Data

US 2019/0377993 A1     Dec. 12, 2019

(30) Foreign Application Priority Data

Jun. 7, 2018   (DE) .................... 10 2018 113 612.9

(51) Int. Cl.
   *G06K 19/077*     (2006.01)
(52) U.S. Cl.
   CPC ................ *G06K 19/0772* (2013.01)
(58) Field of Classification Search
   CPC ........ G06K 19/00; G06K 19/04; G06K 19/06; G06K 19/07
   USPC ................. 235/492, 487, 380, 375
   See application file for complete search history.

(56) References Cited

U.S. PATENT DOCUMENTS

| | | | | |
|---|---|---|---|---|
| 2014/0027520 A1* | 1/2014 | Kato | .................... | H01Q 9/0457 |
| | | | | 235/492 |
| 2016/0110639 A1* | 4/2016 | Finn | .................... | B23K 26/361 |
| | | | | 235/439 |
| 2017/0072736 A1* | 3/2017 | Stoffel | .................... | B29C 43/58 |
| 2019/0286961 A1* | 9/2019 | Lowe | ................ | G06K 19/07718 |

FOREIGN PATENT DOCUMENTS

| | | |
|---|---|---|
| DE | 102011052501 A1 | 2/2013 |
| FR | 2970271 A1 | 7/2012 |
| WO | 2011095873 A1 | 8/2011 |
| WO | 2014122239 A1 | 8/2014 |

OTHER PUBLICATIONS

Non-translated German Search Report dated Nov. 27, 2018. pp. 1-10.
European Office communication, dated Sep. 9, 2019, pp. 1-8.

* cited by examiner

*Primary Examiner* — Edwyn Labaze
(74) *Attorney, Agent, or Firm* — Bond Schoeneck & King, PLLC; George McGuire

(57) ABSTRACT

There is provided an electronic tag for a metal component of a system, wherein the electronic tag includes: a metal support frame, a first portion arranged within the metal support frame and secured relative to the metal support frame, a passive transponder, and a second portion, wherein the second portion secures the passive transponder at least relative to the first portion.

15 Claims, 4 Drawing Sheets

ELECTRONIC TAG FOR A METAL COMPONENT OF A SYSTEM IN A HOUSING

CROSS REFERENCE TO RELATED APPLICATIONS

The present application relates and claims priority to German patent application No. 102018113612.9, filed on Jun. 7, 2018, the entire content of which is incorporated herein by reference.

BACKGROUND

The invention relates to an electronic tag for a metal component of a system.

The problems of the prior art are solved by an electronic tag for a metal component of a system, wherein the electronic tag comprises: a metal support frame, a first portion arranged within the metal support frame and secured relative to the metal support frame, a passive transponder, and a second portion, wherein the second portion secures the passive transponder at least relative to the first portion.

SUMMARY OF THE INVENTION

According to one aspect of this description, an electronic tag is provided for a metal component of a system, the electronic tag comprising: a metal support frame, a first portion arranged within the metal support frame and secured relative to the metal support frame, a passive transponder, and a second portion, wherein the second portion secures the passive transponder at least relative to the first portion.

Advantageously, the metal support frame allows the establishment of an integral connection with the metal component, whereby a captive and damage-resistant arrangement of the electronic tag is made possible.

In addition, the transponder is decoupled from the rigid metal frame by the first portion such that stresses of the support frame are not passed directly to the transponder, which leads to an increased life of the tag.

The first and second portions space the passive transponder from surfaces of the tag. This means that the first and the second portion enclose the transponder and thus protect it from damage. The electromagnetic waves emanating from a reader and passing through the transponder are reflected at the metal component. The reflection effect of the metal component is reduced by the spacing of the passive transponder by at least one of the two portions to such an extent that the transponder can be read by the reader.

Advantageously, the passive transponder is arranged within the metal support frame. As a result, the electronic tag is very flat, can be read easily and offers degrees of freedom for the arrangement, since even a small depth of a blind hole is sufficient to arrange the electronic tag in the metal component.

Advantageously, the second portion is arranged at least in portions within the metal support frame. This arrangement of the second portion contributes to the flat design of the electronic tag.

An advantageous example is characterized in that the first portion is arranged toward an abutment side of the electronic tag, and that the second portion closes the electronic tag with a readout surface.

An advantageous example is characterized in that the second portion is arranged toward an abutment side of the electronic tag, and wherein the first portion closes the electronic tag with a readout surface.

An advantageous example is characterized in that an antenna surface of the passive transponder is spaced by at least ⅕ of a maximum thickness of the electronic tag, in particular at least half of the maximum thickness of the electronic tag, from an abutment surface of the electronic tag. Advantageously, this spacing of the antenna surface from the abutment surface ensures that the transponder remains readable by means of a reader. On the other hand, the thickness of the tag can be kept low, thereby improving the arrangement of the tag in a blind bore of the component of the system.

An advantageous example is characterized in that the metal frame has a cylindrical outer contour.

The cylindrical outer contour allows a corresponding blind bore to be milled in a simple manner into the metal component. The arrangement of the tag is thus simplified.

An advantageous example is characterized in that the metal frame has a passage into which the first portion is pressed. By pressing in the first portion, a simple attachment is used to secure the first portion relative to the metal frame. At the same time, the advantageous spacing relative to the internal transponder is achieved.

An advantageous example is characterized in that the first and the second portion are designed to be electrically insulating. The electrical insulating effect of the first and second portions reduces the reflection effect of the electromagnetic waves emitted by the reader on the metal component.

An advantageous example is characterized in that the first portion comprises a plastics plate. The plastics plate offers advantages for the manufacture of the tag, for example, by pressing the plastics plate into the support frame and during the operation of the tag by the spacing of the antenna of the transponder from the component.

An advantageous example is characterized in that the second portion comprises a hardened potting compound. The hardened potting compound protects the transponder and establishes a form-fitting connection with the support frame and/or the first portion in a simple manner.

An advantageous example is characterized in that the second portion surrounds the passive transponder at least in portions and surrounds the first portion at least in portions. Advantageously, the potting compound secures the transponder in a simple manner relative to the first portion.

An advantageous example is characterized in that the passage has a taper away from the first portion, and wherein the hardened potting compound surrounds the taper at least in portions. Advantageously, a form-fitting connection of the hardened potting compound with the metal ring is thereby achieved, which improves the securement of the transponder. The life of the tag is thus increased.

An advantageous example is characterized in that the first portion has a proximal recess, in which the transponder is arranged, and that the second portion is arranged between lateral surfaces of the transponder and walls of the recess. The spacing of the lateral surfaces of the transponder from the walls of the recess reduces stresses introduced into the transponder starting from the first portion. The hardened potting compound, which has a lower modulus of elasticity than the transponder and the first portion, provides for the securement of the transponder and at the same time for stress decoupling of the transponder and the first portion. As a result, the life of the electronic tag is increased.

A further aspect of this description relates to a metal component of a system comprising the electronic tag according to any of the preceding examples, wherein the component has a blind bore in which the electronic tag is accommodated.

An advantageous example is characterized in that a distal surface of the metal support frame is flush with a surface of the metal component that surrounds the blind bore. The flushness advantageously improves the cleanability and prevents damage to the metal component.

An advantageous example is characterized in that the support frame is welded to the metal component.

DETAILED DESCRIPTION

Figure 1:
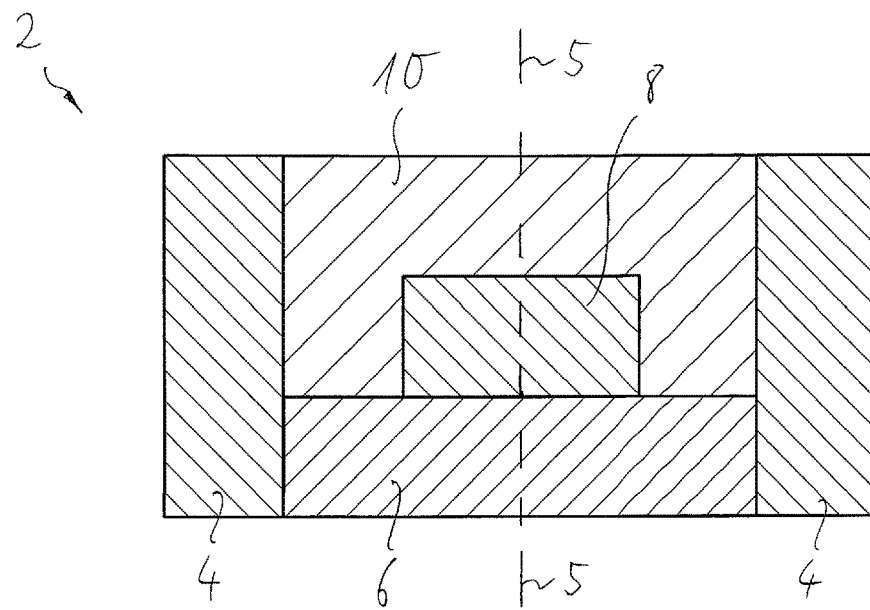
FIGS. 1 to 3 each show a schematic section of an electronic tag.

FIG. 1 shows a schematic section of an electronic tag 2 for a metal component of a system. The electronic tag 2 comprises an outer support frame 4, which is constructed, for example, so as to be rotationally symmetrical about a central axis 5. For example, the tag 2 may be substantially disc-shaped. Of course, the support frame 4 may also not be rotationally symmetrical. Within the metal support frame 4, a first portion 6 is arranged and secured relative to the support frame 4. A passive transponder 8 is secured by means of a second portion 10 at least relative to the first portion 6. In one example, the second portion 10 secures the transponder 8 relative to the first portion 6 and relative to the support frame 4. The first and the second portion 6, 10 are made electrically insulating, which means that the first and the second portion 6, 10 are made of a material of which the electrical conductivity is less than $10^{-8}$ S/cm in each case.

Figure 2:
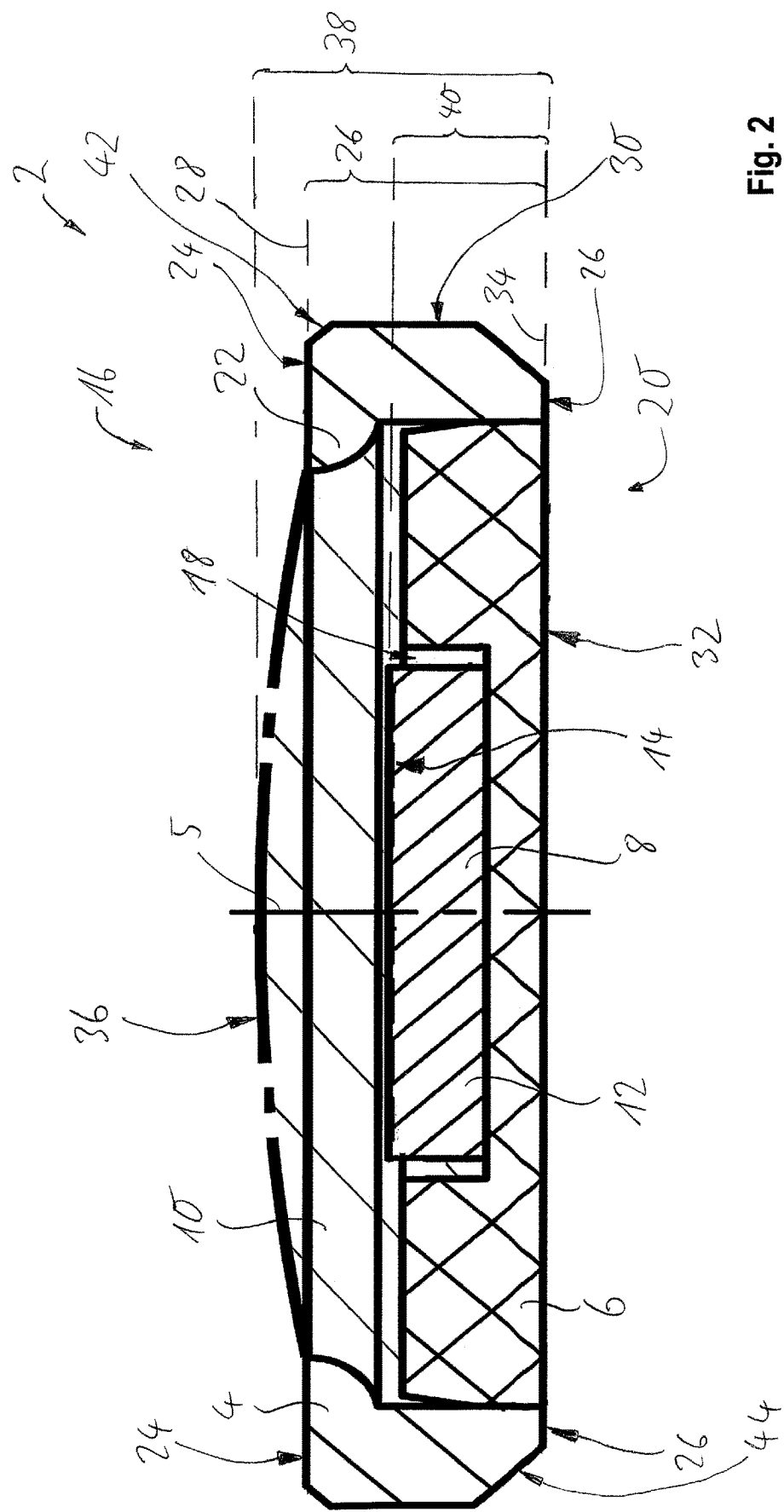

FIG. 2 shows a further schematic section of the electronic tag 2. In the present case, the transponder 8 comprises a substrate 12, on the surface of which an antenna surface 14 is formed, in which the antenna is formed, for example as a conductor track arranged on the substrate. In the present case, the antenna surface 14 is arranged in the direction of a readout side 16. Furthermore, the transponder comprises an electronic circuit (not shown) with a readable memory. The transponder is in particular an RFID chip. The transponder 8 abuts in a proximal recess 18 of the first portion 6 flat on a bottom of the recess of the first portion 6. Laterally, the transponder 8 is spaced apart from walls of the proximal recess 18, this space being filled with potting compound of the second portion 10. The transponder 8 protrudes with the antenna surface 14 out of the recess 18.

The metal support frame 4 has a passage into which the first portion 6 is pressed starting from an abutment side 20. In the proximal direction, the first portion 6 tapers, so that pressing-in is simplified and potting compound of the second portion 10 can flow into a gap between the support frame 4 and the first portion 6 during the manufacture of the tag 2. Leading away from the first portion 6, the passage of the support frame 4 narrows in a portion 22. The hardened potting compound of the second portion 10 establishes a form-fitting connection with the portion 22 in the direction of the readout side 16.

The electronic tag 2 is provided for an arrangement in a blind bore of the metal component. A distance 26 between a distal surface 24 of the support frame 4 and an abutment surface 26 of the support frame 4 substantially coincides with a depth of the blind bore, so that the distal surface 24 and the surface of the metal component that surrounds the blind bore lie in a common imaginary plane 28. A lateral surface 30 extends substantially in parallel with the center axis 5 and is provided for abutment against side walls of the blind bore. A contact surface 32 of the first portion 6 and the abutment surface 26 lie in a common imaginary plane 34.

The passive transponder 8 is arranged between the imaginary plane 28, which runs through the distal surface 24 of the support frame 4, and the imaginary plane 34, which extends through the abutment surface 26 of the support frame 4. The second portion 10 is also arranged at least in portions within the metal support frame 2. The first and second portions 6 and 10 are separate elements. The first and the second portion 6 and 10 secure the passive transponder 8 in such a manner relative to the metal support frame 4 that the transponder 8 is completely within the support frame 4 and yet spaced from an inner wall of the support frame 4. In this case, the first portion 6 is entirely within the support frame 4. Thus, the passive transponder 8 is positioned by means of the first and second portions 6 and 10 within the metal support frame 4 such that it is entirely within a space delimited by the metal support frame 4.

The potting compound of the second portion 10 forms a readout surface 36 on the readout side 16, by which readout surface the transponder 8 can be read out. The readout surface 36 merges flush into the surface 24 of the support frame 4. Inwardly, the readout surface 36 comprises an elevation, which determines the maximum thickness 38 of the tag 2. The antenna surface 14 of the transponder 8 is spaced by a distance 40 from the imaginary plane 34, that is to say from at least one of the abutment surfaces 26, 32. The distance 40 is at least ⅕ of the maximum thickness 38 and is in particular at least half of the maximum thickness 38.

In the region of a chamfer 42, the metal support frame 4 is welded to the metal component of the system. A proximal chamfer 44 corresponds to the inner contour of the blind hole.

The first portion 6 comprises, for example, PEEK (polyether ether ketone) or PVDF (polyvinylidene fluoride). The second portion 10 includes, for example, the potting compound in the form of a cured epoxy resin. The metal support frame 4 includes, for example, stainless steel.

Figure 3:
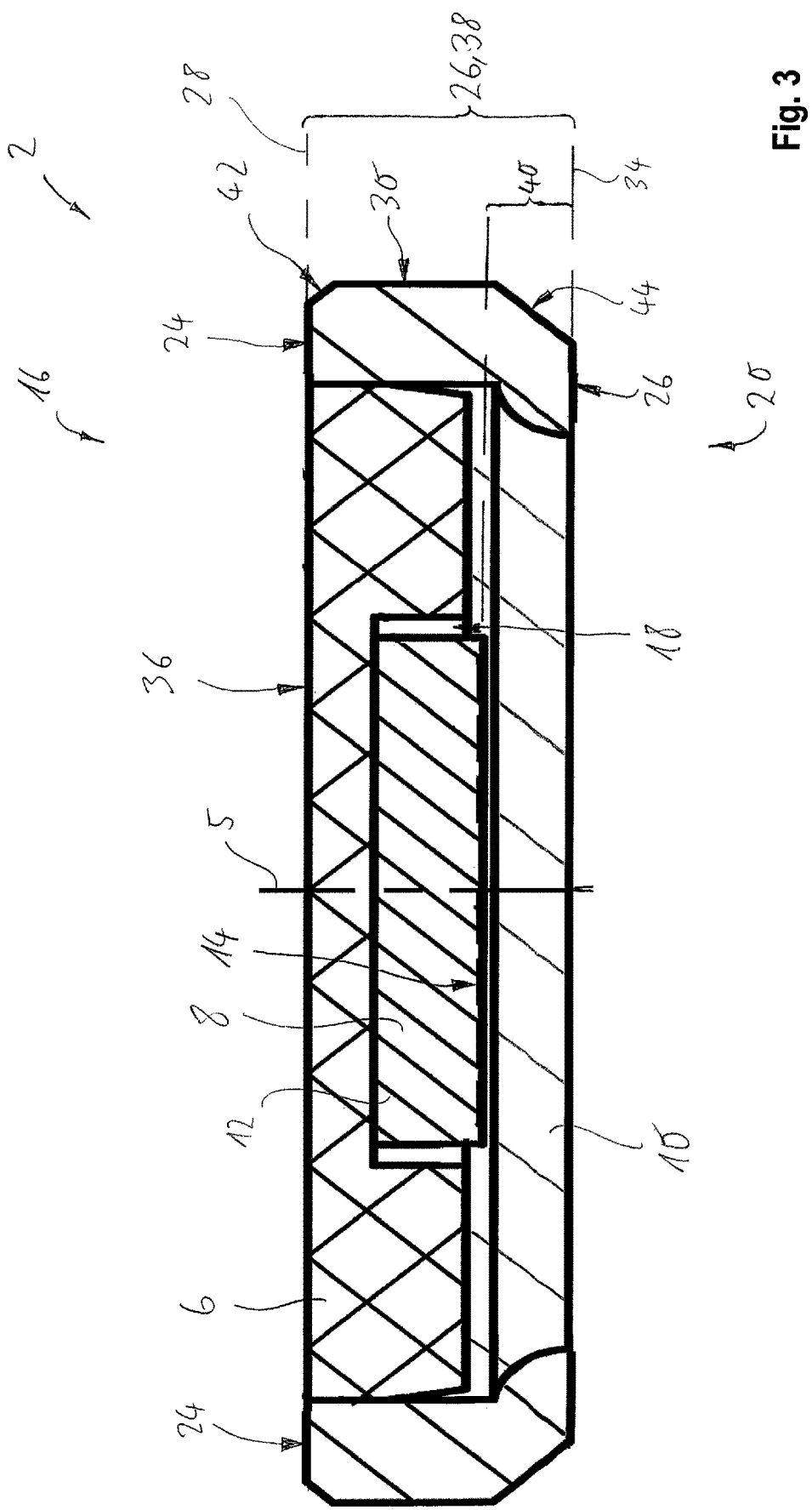

FIG. 3 shows a further schematic section of the electronic tag 2. In contrast to the embodiment of FIG. 2, the first portion 6 is arranged in the direction of the readout side 16 and the second portion 10 is arranged in the direction of the abutment side 20. Consequently, the first portion 6 forms the readout surface 36. The antenna surface 14 of the transponder 8 is oriented in the direction of the abutment side 20.

Figure 4:
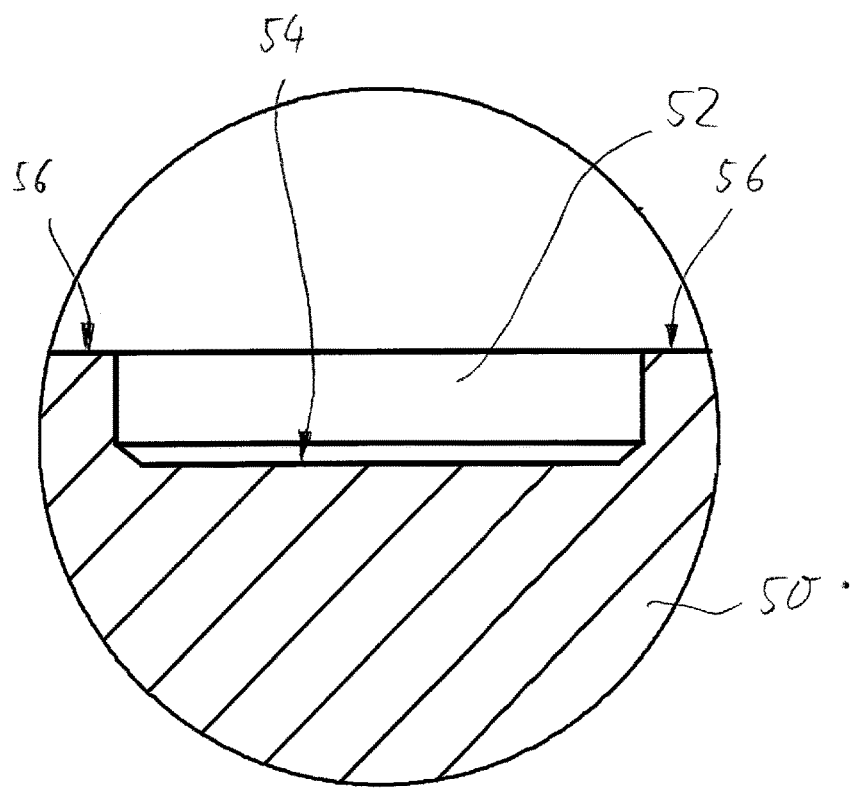
FIG. 4 shows a schematic section of a blind bore.

FIG. 4 shows a schematic section of the metal component 50 of the system. The metal component 50 has the blind bore 52, the inner contour of which corresponds to the outer contour of the electronic tag. At a bottom 54 of the blind bore 52 is at least the metal support frame of the tag. The distal surface of the tag and the surface 56 surrounding the blind bore 52 are preferably in the common imaginary plane.

Figure 5:
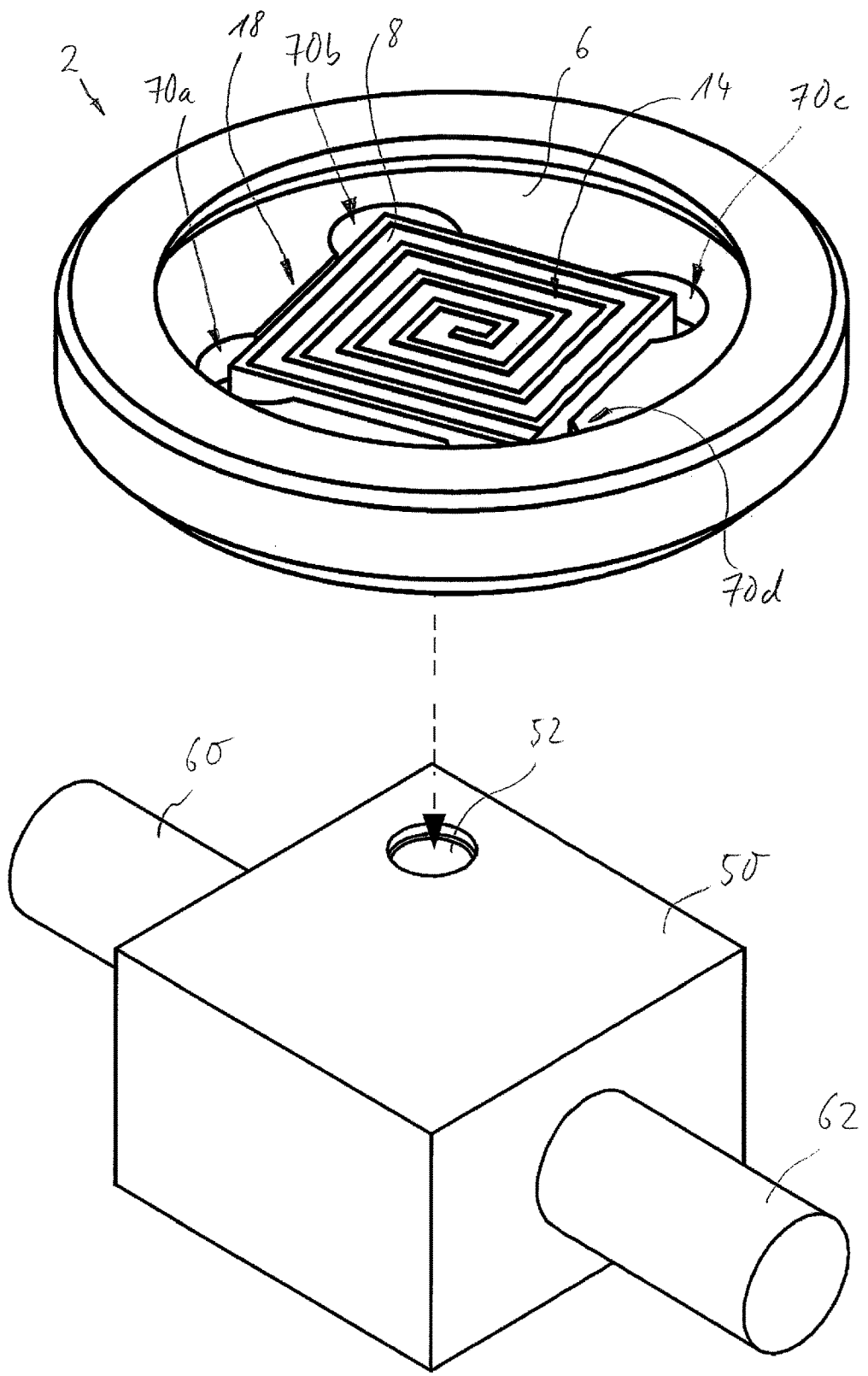
FIG. 5 shows a schematic perspective view of a component of a system.

FIG. 5 shows a schematic perspective view of the metal component 50 of the system, in particular an industrial system, in the blind bore 52 of which the electronic tag 2 is arranged. The metal component 50 is an example of a valve body for a fluid valve comprising an inlet 60 and an outlet 62. Of course, the tag 2 can be arranged on any other metal component of the system such as a drive or a housing.

The tag 2 shown in FIG. 5 is shown by way of example without the second portion and allows the view of the antenna surface 14 of the transponder 8. The antenna of the transponder 8 is arranged on the substrate of the transponder 8 and is constructed, for example, in a spiral manner. The recess 18 of the first section 6 includes inner contour portions 70*a*, 70*b*, 70*c* and 70*d* which surround corners of the transponder 8 and each follow an imaginary circular cylinder surface, which contour portions reduce coupling of stresses into the transponder 8 when filled with potting compound of the second section.

What is claimed is:

1. A metal component of an industrial equipment, wherein the metal component comprises electronic tag that comprises:
   a. a metal support frame,
   b. a first portion arranged within the metal support frame and secured relative to the metal support frame,
   c. a passive transponder, and
      a. a second portion, wherein the second portion secures the passive transponder at least relative to the first portion
         wherein the metallic component is provided with a blind bore in which the electronic tag is accommodated;
         wherein the transponder is arranged entirely within the blind bore; and
      wherein a surface of the metallic holding frame is flush with a surface of the metallic component surrounding the blind bore.

2. The metal component according to claim 1, wherein the passive transponder is arranged within the metal support frame.

3. The metal component according to claim 1, wherein the second portion is arranged at least in portions within the metal support frame.

4. The metal component according to claim 1, wherein the first portion is arranged toward an abutment side of the electronic tag, and wherein the second portion closes the electronic tag with a readout surface.

5. The metal component according to claim 1, wherein the second portion is arranged toward an abutment side of the electronic tag, and wherein the first portion closes the electronic tag with a readout surface.

6. The metal component according to claim 1, wherein an antenna surface of the passive transponder is spaced by at least $\frac{1}{5}$ of a maximum thickness of the electronic tag, in particular at least half of the maximum thickness of the electronic tag, from one or the abutment surface of the electronic tag.

7. The metal component according to claim 1, wherein the metal support frame has a cylindrical outer contour.

8. The metal component according to claim 1, wherein the metal support frame has a passage into which the first portion is pressed.

9. The metal component according to claim 1, wherein the first and the second portion are made electrically insulating.

10. The metal component according to claim 1, wherein the first portion comprises a plastics plate.

11. The metal component according to claim 10, wherein the second portion surrounds the passive transponder at least in portions and surrounds the first portion at least in portions.

12. The metal component according to claim 10, wherein the passage of the support frame has a taper away from the first portion, and wherein the hardened potting compound surrounds the taper at least in portions.

13. The metal component according to claim 1, wherein the second portion comprises a hardened potting compound.

14. The metal component according to claim 1, wherein the first portion has a proximal recess in which the transponder is arranged, and wherein the second portion is arranged between lateral surfaces of the transponder and walls of the recess.

15. The metal component according to claim 1, wherein the support frame is welded to the metal component.

\* \* \* \* \*